United States Patent
Revsin et al.

(10) Patent No.: US 7,330,432 B1
(45) Date of Patent: Feb. 12, 2008

(54) METHOD AND APPARATUS FOR OPTIMIZING CHANNEL BANDWIDTH UTILIZATION BY SIMULTANEOUS RELIABLE TRANSMISSION OF SETS OF MULTIPLE DATA TRANSFER UNITS (DTUS)

(75) Inventors: Vitaly S. Revsin, Andover, MA (US); Alexander M. Pass, North Andover, MA (US); Irina P. Slutsky, Andover, MA (US)

(73) Assignee: Network Appliance, Inc., Sunnyvale, CA (US)

( * ) Notice: Subject to any disclaimer, the term of this patent is extended or adjusted under 35 U.S.C. 154(b) by 1099 days.

(21) Appl. No.: 10/237,944

(22) Filed: Sep. 9, 2002

Related U.S. Application Data (60) Provisional application No. 60/334,726, filed on Nov. 15, 2001.

(51) Int. Cl.
  *G01R 31/08* (2006.01)
(52) U.S. Cl. ........................ 370/235; 370/278; 370/912; 714/18; 714/821
(58) Field of Classification Search ................ 370/235, 370/278, 912; 714/18, 821
  See application file for complete search history.

(56) References Cited

U.S. PATENT DOCUMENTS

| | | | |
|---|---|---|---|
| 5,727,002 A * | 3/1998 | Miller et al. ................. | 714/748 |
| 6,289,482 B1 * | 9/2001 | Joshi et al. .................. | 714/748 |
| 6,728,548 B1 * | 4/2004 | Willhoff ...................... | 455/466 |
| 2003/0112817 A1 * | 6/2003 | Woo et al. ................... | 370/413 |

\* cited by examiner

*Primary Examiner*—Ricky Q. Ngo
*Assistant Examiner*—Kibrom T Hailu
(74) *Attorney, Agent, or Firm*—Weingarten, Schurgin, Gagnebin & Lebovici LLP (57) ABSTRACT

A system and method for reliably transmitting large amounts of data over a high speed network with large latency, such as a communication satellite based network. A transmitting device transmits data transfer units (DTUs) to one or more receiving devices. The transmitting device forms and transmits burst consisting of reliably delivered sets of multiple DTUs. Both the transmitting device and the receiving devices process multiple bursts in parallel, such that subsequent bursts can be transmitted and received prior to the correct receipt of a previously transmitted burst at all of the receiving devices, and/or prior to receipt of a status report at the transmitting device regarding a previously transmitted burst. The transmitting device operates to transmit subsequent bursts even before the receipt of a status information regarding a previous burst, and the receiving devices process subsequently received bursts while awaiting retransmission of a lost or damaged DTU from a previous burst.

24 Claims, 6 Drawing Sheets

METHOD AND APPARATUS FOR OPTIMIZING CHANNEL BANDWIDTH UTILIZATION BY SIMULTANEOUS RELIABLE TRANSMISSION OF SETS OF MULTIPLE DATA TRANSFER UNITS (DTUS)

CROSS REFERENCE TO RELATED APPLICATIONS

This application claims priority under 35 U.S.C. §119(e) to provisional patent application Ser. No. 60/334,726 filed Nov. 15, 2001.

STATEMENT REGARDING FEDERALLY SPONSORED RESEARCH OR DEVELOPMENT

N/A

BACKGROUND OF THE INVENTION

The present invention relates generally to communication protocols, and more specifically to a system for optimizing channel bandwidth utilization by simultaneously transmitting sets of multiple Data Transfer Units (DTUs), while also collecting receipt status information regarding previously transmitted DTUs.

In many applications, as it is generally known, the reliable transmission of data from a transmitting device to one or more receiving devices requires that some kind of feedback information be provided from the receivers to the transmitter to acknowledge receipt or request data re-transmission. In many types of networks, such as communication satellite based networks, large amounts of data are transmitted through high-speed channels with potentially large latency and high rates of data loss. In this category of networks in particular, the provision of feedback information to transmitters from receivers may cause a significant waiting period between when a transmission is completed and when the transmitter receives the relevant feedback information describing whether a retransmission is required. The transmitted data must remain queued in the transmitter during such a period, since retransmission may be necessary. As a consequence, overall system performance may suffer, potentially resulting in a significant loss of overall throughput in the network.

In some existing systems, large blocks of data may be transmitted by a transmitting device, which then waits until a status indication has been received from the receiver before either re-transmitting data in the block or moving on to transmission of a subsequent block. In order to limit the amount of waiting required in the transmitter, the size of such blocks of transmit data has been limited by a practical upper bound.

Other existing systems transmit data until an indication is received from a receiving device that a portion of previously transmitted data was not correctly received. The transmitter then retransmits all previously transmitted data beginning with the portion that was reported as lost.

In general, such approaches taken by existing systems have been appropriate for file transfers, but have significant drawbacks when applied to operational environments in which multi-media data is streamed to real time application on one or more receiving devices. In such streaming media applications, new data must be continuously provided to the receiver(s) so that the presentation of data to a user or users is not paused or interrupted. Moreover, the retransmission of data that was correctly received may waste valuable bandwidth, and accordingly retransmissions should minimally interfere with the provision of new data from the transmitter.

For these reasons and others, it would be desirable to have a system for transmitting data which is more suitable for real-time, media-streaming applications. The system should desirably cause less overall waiting time in the transmitter than existing systems, provide more flexibility with regard to the amount of data which can be transmitted without receipt of confirmation from a receiver, and improve network bandwidth utilization.

SUMMARY OF THE INVENTION

In accordance with the present invention, a system and method are disclosed for reliably transmitting large amounts of data over a high speed network with large latency, such as a communication satellite based network. In the disclosed system, a transmitting device transmits data in the form of data transfer units (DTUs), such as data packets, to one or more receiving devices. The transmitting device organizes the outgoing data into sets of multiple DTUs, referred to for example herein as "bursts", that are transmitted to the receiving devices while simultaneously receiving and processing receipt status information regarding previously transmitted DTUs, and retransmitting lost data or repair data. One or more receiving devices generate status report messages in response to each received burst, and/or in response to other predetermined events.

In order to optimize bandwidth utilization, both the transmitting device and the receiving device or devices process multiple bursts in parallel. In other words, the transmitting device and receiving devices process multiple bursts in an overlapping fashion, such that subsequent bursts can be transmitted and received prior to the correct receipt of a previously transmitted burst at all of the receiving devices, and/or prior to receipt of a status report at the transmitting device regarding a previously transmitted burst. Accordingly, even before the receipt of a status report from each receiver regarding a first burst, or before receipt of a status report indicating correct receipt of all data within the first burst, the transmitting device may begin transmission of DTUs from a second burst. Additionally, while a receiving device is awaiting retransmission of a lost or damaged DTU from a first burst, that receiving device concurrently begins processing other bursts in order to determine the contents of a status report to be sent to the transmitting device.

The disclosed system advantageously operates in a media-streaming application context by continuously providing data to one or more receiving devices, while also retransmitting or repairing data lost from previously transmitted bursts. Moreover, the present system continues collecting information regarding lost or damaged DTUs from received status reports while continuing to transmit further bursts. This enables the disclosed system to provide repair or retransmission data conveniently, for example in response to a predetermined condition, such as meeting a threshold amount of lost DTUs, or a pause in data to be transmitted.

BRIEF DESCRIPTION OF THE SEVERAL VIEWS OF THE DRAWINGS

The invention will be more fully understood by reference to the following detailed description of the invention in conjunction with the drawings, of which.

DETAILED DESCRIPTION OF THE INVENTION

All disclosures of U.S. provisional patent application No. 60/334,726, filed Nov. 15, 2001, and entitled "Method and Apparatus for Optimizing Channel Bandwidth Utilization by Simultaneous Reliable Transmission of Sets of Multiple Data Transfer Units (DTUs)," are hereby incorporated herein by reference.

Figure 1:
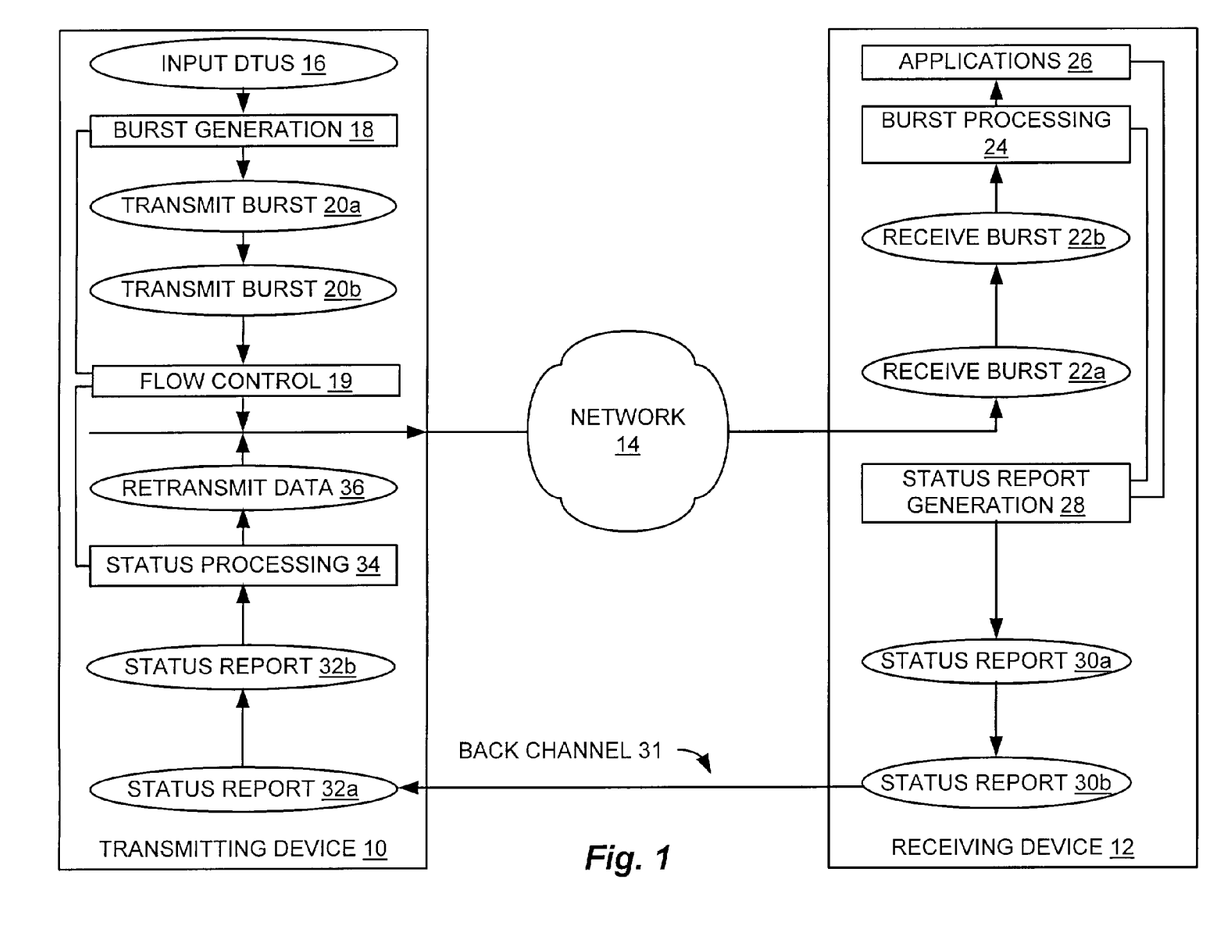
FIG. 1 is a block diagram showing a transmitting device and a receiving device communicating over a communication network.

FIG. 1 shows a transmitting device 10 and a receiving device 12 that are communicably attached to a network 14. The transmitting device 10 and/or receiving device 12, for example, may each be embodied as any specific type of network attached device, such as server computer systems, personal computers, workstations, or other network enabled devices which operate to communicate over a communication network. The transmitting device 10 and/or receiving device 12 may each include one or more processors, as well as computer program storage and/or memory for storing computer program code that is executable on such processors. The transmitting device 10 and receiving device 12 may each further include various input/output interfaces, including network interfaces to the network 14. The network 14 may, for purposes of explanation, consist of any appropriate communication media and networking protocols which enable the transfer of information between the transmitting device 10 and the receiving device 12. In one embodiment, the network 14 is a communication satellite based network over which the transmitting device 10 communicates with multiple receiving devices, such as the receiving device 12, using multicast or group destination addresses. Further for purposes of illustration, the network 14 may employ a communication protocol such as TCP/IP or the like to support various layers of communication among the devices to which it is attached.

During operation of the devices shown in FIG. 1, data transfer units (DTUs) 16 are passed to a burst generation processing component 18 of the transmitting device 10. The disclosed system may be used with any specific kind of DTU, including packets, cells, or other appropriate types of data blocks for a given implementation. The burst generation component 18 may, for example, be embodied using any appropriate combination of software code and/or programmable or custom hardware based technology. The burst generation component 18 in the transmitting device 10 operates to organize the DTUs it is provided into reliably delivered sets of DTUs, referred to herein as "bursts." Multiple bursts may be processed simultaneously in both the transmitting device and the receiving device(s). The input DTUs may be provided to the burst generation component 18 continuously, periodically, or as needed by application programs executing on the transmitting device 10.

The burst generation component 18 operates to continuously process the input DTUs 16 to produce a stream of transmit bursts, shown for purposes of illustration as transmit burst 20a and transmit burst 20b. Multiple transmit bursts may be processed simultaneously in the transmitting device 10, such that burst generation and transmission may continue even in the case where a DTU from a previously transmitted burst has not been acknowledged, or in the case where one or more DTUs in a previously transmitted burst have been indicated as lost or damaged by one or more receiving devices. While for purposes of illustration FIG. 1 shows 2 transmit bursts 20a and 20b, the number of transmit bursts that may be processed simultaneously by the transmitting device 10 in the disclosed system is not limited to that number, and any specific number or range of numbers of transmit bursts may be processed simultaneously by a transmitting device in a specific embodiment. In one embodiment, the transmit bursts processed simultaneously in the transmit device are each stored for potential retransmission, so that when a predetermined event occurs or is detected, those DTUs from previously transmitted bursts that have been indicated as lost or damaged by at least one receiving device, or that have not been acknowledged after some predetermined time limit, can be retransmitted to at least those receiving devices to which they were either incorrectly delivered or not delivered at all. Alternatively, error correction or repair data may be sent from the transmitting device to the receiver or receivers to enable such receiving devices to determine the contents of previously transmitted DTUs that were either lost or damaged. The predetermined event that triggers retransmission or transmission of repair data may, for example, consist of an indication that the amount of data which was not correctly received by one or more of the receiving devices is equal to the current burst size. Alternatively, the predetermined event may consist of an indication that no further data is available for transmission from the transmitting device. The transmitting device operates to schedule such retransmissions or transmission of repair data such that the ongoing transmission of any individual burst that is currently being transmitted is not interrupted or interfered with. Accordingly, such retransmissions are scheduled to occur between ordinary burst transmissions. In the event that attempts to successfully deliver any specific DTU to one or more receiving devices fails for some predetermined maximum time period, the transmitting device may operate to cease retransmission attempts, and discard that data, since data that was originally transmitted at a time sufficiently prior would not be useful to a real time application on the receiving devices. Such a time out period may be user configurable, and/or be determined or based on the specific execution and/or application environment in which the present system is embodied.

Each of the transmit bursts 20a and 20b generated by the burst generation component 18 are sent by the transmitting device 10 over the network 14 to one or more receiving devices, shown for purposes of illustration as the receiving device 12 in FIG. 1. As shown in FIG. 1, the receiving device 12 receives each burst from the transmitting device 10, shown as the receive bursts 22a and 22b. Like the transmitting device 10, the receiving device 12 processes multiple bursts, shown as receive burst 22a and receive burst 22b, simultaneously. In other words, if one or more DTUs of a given burst are either missing or damaged, the receiving device nevertheless continues processing subsequent bursts to determine whether the DTUs within them have been received correctly, and to pass correctly received bursts or portions of bursts to higher software layers, such as application programs 26 executing on the receiving device 12. In FIG. 1, the receive bursts 22a and 22b are shown being processed simultaneously by the receive burst processing component 24 in the receiving device 12. While two receive bursts are shown being processed simultaneously for purposes of illustration in FIG. 1, the invention is not so limited, and any number of receive bursts may be simultaneously processed in the receiving device 12 in a given embodiment. For example, those multiple receive bursts being processed simultaneously in the receiving device 12 may consist of and/or include some number of previously received bursts in which at least one DTU was either lost or incorrectly delivered, so that when a correct retransmission of that DTU is received, it may be combined with the previous correctly received DTUs in the burst to complete the burst. Such a completed burst may then be delivered to one or more software applications 26 on the receiving device 12.

The receive burst processing component 24 in the receiving device 12 may, for example, be embodied using any appropriate combination of software code and/or programmable or custom hardware based technology. The receive burst processing component 24 determines which of the DTUs within the receive bursts 22a and 22b have been correctly received, and passes on a description of any lost or damaged DTUs to the status report generating component 28. As further receive bursts arrive at the receiving device 12, the receive burst processing component 24 also operates to pass the DTUs from the receive bursts 22a and 22b to one or more of the application programs 26 for processing. The application programs 26 in turn operate to report the processing status of each DTU to the status report generating component 28.

In parallel with the operation of the burst processing component 24 and the application programs 26, the status report generating component 28 processes information regarding correct delivery and processing of received DTUs in order to generate a continuous stream of status report messages, such as the status reports 30a and 30b shown in FIG. 1. The receiving device 12 further operates to continuously transmit the status reports 30a and 30b to the transmitting device 10, where they are shown as the received status reports 32a and 32b. The status reports 30a and 30b may be conveyed to the transmitting device 10 using any appropriate type of message format, such as a burst, single DTU, or other type of message. In a first embodiment, the status reports 30a and 30b are conveyed from the receiving device 12 to the transmitting device 10 over a back channel 31, separate from the network 14 over which data bursts are sent from the transmitting device 10 to the receiving device 12. In the case where the network 14 is a communication satellite based network over which the transmitting device 10 communicates with multiple receiving devices, the back channel 31 may be provided using a relatively low bandwidth, high latency communication service, for example over the Internet. Alternatively, the status reports 30a and 30b may be sent to the transmitting device 10 using the same network over which the data bursts are conveyed to the receiving device 12, shown as the network 14 in FIG. 1. In another alternative embodiment, the status reports 30a and 30b may be sent to the transmitting device over point to point connections between the receivers and the transmitting device. The status reports 30a and 30b may, for example, include information regarding unsuccessfully received DTUs within previous bursts, the amount of buffers available for receiving subsequent data, and/or a rate at which subsequent data should be transmitted from the transmitting device.

When the status reports 32a and 32b are received by the transmitting device 10, they are passed to the status report processing component 34. The status report processing component 34 examines the received status reports 32a and 32b, and to determine which previously transmitted DTUs need to be retransmitted to the receiving device 12. Multiple status reports may be processed simultaneously by the status processing component 34. Those previously transmitted DTUs which need to be retransmitted are shown as retransmitted data 36, and are sent, for example over the network 14, to the receiving device 12. Upon the correct receipt of the retransmitted data 36 by the receiving device 12, previously sent DTUs that were damaged or lost are replaced and delivered to relevant application programs as necessary. Subsequent status reports from the receiving device 12 may accordingly reflect the receipt and processing status of such retransmitted data. The receive burst processing component 24, status report generating component, and status report processing component 34 may each be embodied using any appropriate combination of software code and/or programmable or custom hardware based technology.

While for purposes of concise illustration a single receiving device 12 is shown in FIG. 1, the disclosed system is advantageously applicable where a single transmitting device 10 operates to transmit individual bursts that are each received by multiple receiving devices. For example, such may be the case where multicast destination addresses are employed by the transmitting device. In the case where multiple receiving devices receive the bursts transmitted by the transmitting device, the structure and operation described herein with reference to receiving device 12 may be applicable to any or all such multiple receiving devices.

Figure 2:
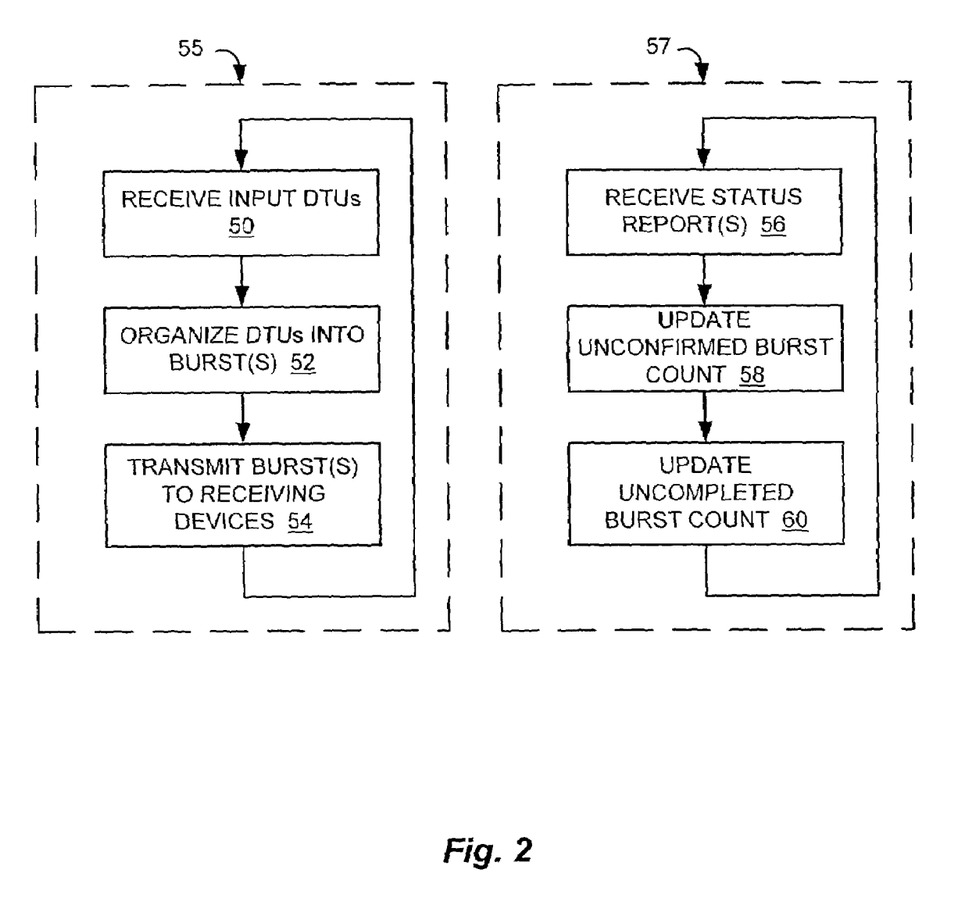
FIG. 2 is a flow chart showing steps performed by an illustrative embodiment of a transmitting device.

Now with reference to FIG. 2, steps performed by an illustrative embodiment of a transmitting device, such as the transmitting device 10 of FIG. 1, are described. In FIG. 2, two independent processes, 55 and 57 are shown performed simultaneously. The processes 55 and 57 may be implemented as concurrently executing software processes, or in hardware logic, or in any appropriate combination of hardware and/or software, as needed by a particular embodiment or application of the disclosed system. The process 55 will be referred to herein as the burst generation and transmission process 55, and the process 57 will be referred to herein as the status report receipt and processing process 57.

At step 50 in the process 57, the transmitting device receives a number of DTUs for transmission to one or more receiving devices, such as the receiving device 12 of FIG. 1. At step 52, the transmitting device organizes at least one set of the DTUs received at step 52 into at least one burst for transmission. In the illustrative embodiment, each DTU within a burst contains information that enables a receiving device to determine the end of the burst, such as a position of that DTU within the burst.

The size of a burst, in terms of the number of DTUs within the burst, is referred to herein for purposes of explanation as the "burst size." The burst size for a given communication session may be a configurable parameter, determined and distributed among the transmitting device and receiving devices using a predetermined management protocol. Burst size is predetermined for purposes of explanation in the illustrative embodiment. A suitable burst size value for a given implementation may be determined in a variety of different ways. For example, an embodiment of the disclosed system has been shown to operate well where the burst size is set to a value on the order of 100 or 1000 DTUs. The bursts generated at step 52 in the process 55 are transmitted to one or more receiving devices at step 54.

As described above, steps 50, 52 and 54 represent a burst generation and transmission process 55. The burst generation and transmission process 55 continues while status reports are concurrently received and processed in the status report receipt and processing process 57. In one embodiment, the burst generation and transmission process 55 continues independently until a stop transmit condition is detected, at which point burst generation and transmission is paused or halted until a predetermined burst generation and transmission continuation condition is met.

Now with reference to the status report receive process 57, at step 56 the transmitting device continuously receives status report messages. The received status report messages each include information describing the status of DTUs in one or more previously transmitted bursts, with regard to one of potentially many receiving devices.

In an illustrative embodiment, the transmitting device maintains state with regard to previously transmitted bursts as follows:

1) A "confirmed burst" is a previously transmitted burst for which the transmitting device has received status reports from all receiving devices to which the burst was addressed. The DTUs within a confirmed burst may or may not have been successfully received by all receiving devices for that burst.

2) An "unconfirmed burst" is a previously transmitted burst for which the transmitting device has not received a status report from at least one of the receiving devices to which the burst was addressed.

3) A "completed burst" is a confirmed burst for which all receiving devices have confirmed that they have successfully received and processed all DTUs within the burst.

4) An "uncompleted burst" is a confirmed or unconfirmed burst that requires some amount of retransmission, since at least one of the receiving devices to which the burst was addressed has indicated that at least one DTU within the burst was lost or damaged.

During processing of the status reports received at step 56, the transmitting device updates counters or other data structures that are used to maintain the numbers of bursts that fall within each of the above categories. In particular, at step 58, the transmitting system may update an unconfirmed burst counter, or the equivalent, to reflect the number of unconfirmed bursts in view of the information contained in the status report. For example, in the event that status reports have been received from every receiving device for a given burst, then a number of unconfirmed bursts is decremented at step 58. Similarly, if all the receiving devices for a given burst have provided status reports indicating that all DTUs within that burst have been successfully received and processed, then a representation of the number of uncompleted bursts can be decremented at step 60. Those skilled in the art will recognize that a variety of specific mechanisms can be used for maintaining counts with regard to the above listed categories of bursts. The disclosed system is not limited to decrementing individual counters for unconfirmed bursts and uncompleted bursts at steps 58 and 60, and other specific data structures and/or steps may be used to maintain counts for some or all of the above burst categories. Moreover, those skilled in the art will further appreciate that while the above categories are described for purposes of explanation as numbers of bursts, they may be maintained as numbers of DTUs, or bytes, or some other appropriate metric in a given implementation.

In one embodiment, the burst generation and transmission process 55 may be halted or suspended in the event that a predetermined event occurs. For example, the transmitting device may operate to determine whether either:

a) a total number of unconfirmed bursts exceeds a predetermined maximum number of unconfirmed bursts, or b) a total number of uncompleted bursts exceeds a predetermined maximum number of uncompleted bursts.

In the event that either of the above conditions are met, the transmitting device may operate to temporarily stop generating and transmitting bursts. For example, the maximum number of unconfirmed bursts may represent a limit on the amount of receive buffers for receiving bursts in any of the receiving devices in a group of receiving devices to which bursts are transmitted by the transmitting device. The maximum number of uncompleted bursts may represent a limit on the amount of buffers available for storing previously transmitted bursts in the transmitting device. Further in response to a determination that one of the above conditions is true, the disclosed system may operate to send one or more status request messages, and/or retransmit any lost or damaged DTUs to one or more receiving devices. For example, in the case where the number of unconfirmed bursts exceeds the predetermined limit, then the transmitting device may operate to send status request messages to one or more of the receiving devices, requesting status reports be returned. For example, in one embodiment, the status request message is multicast addressed and includes a list of device identifiers corresponding to those receiving devices in the receiver group for which status reports are requested.

In the event that the number of uncompleted bursts exceeds a predetermined limit, the transmitting system may retransmit DTUs previously reported to be lost or damaged to one or more receiving devices. Alternatively, or in addition, other conditions may trigger transmitting devices in the disclosed system to retransmit data and/or send status request messages. For example, a transmitting device may initiate a process in which lost data is retransmitted in response to a determination that the total number of lost DTUs is equal to the size of a burst, and/or when the data for a next burst is not yet available for transmission. A transmitting device may further be designed or configured to initiate retransmission of lost data as soon as a given burst has been confirmed, in that status reports have been received from all receiving devices. Alternatively, a transmitting device may operate such that it does not wait until a burst has been fully confirmed to start transmitting DTUs that have been reported as lost, acting to retransmit DTUs to those receiving devices that have provided status reports indicating that the DTUs have been lost.

After a predetermined number of requested status reports have been received, or after a predetermined number of DTUs reported as lost have been retransmitted and successfully received and processed, the transmitting device resumes the burst generation and transmission process 55. For example, when the number of unconfirmed bursts has gone below the predetermined limit on unconfirmed bursts, or when some threshold lower than the predetermined limit on unconfirmed bursts has been reached, the transmitting device may resume or restart the burst generation and transmitting process 55. Similarly, when the number of uncompleted bursts has gone below the predetermined limit on uncompleted bursts, or when some threshold lower than the predetermined limit on uncompleted bursts has been reached, the burst generation and transmission process 55 may be resumed.

As illustrated in FIG. 2 and described above, the operation of the transmitting device with regard to organizing data into bursts, transmitting one or more bursts, and receiving status reports with regard to previously transmitted bursts is such that transmit burst processing and status report processing are overlapped and independent. The received status reports are processed as soon as they are received to determine what data was not successfully received at one or more receiving devices. Retransmissions are scheduled without interfering with the continuous processing and transmitting of DTUs within bursts by the transmitting device.

In this way, the disclosed system continuously collects information regarding lost or damaged DTUs across multiple transmit bursts until a predetermined retransmission event, which may be a function of the amount or number of lost or damaged DTUs, occurs or is detected. Repairing of previously transmitted bursts is thus accomplished in parallel with the continuous and uninterrupted transmission of subsequent bursts.

Figure 3:
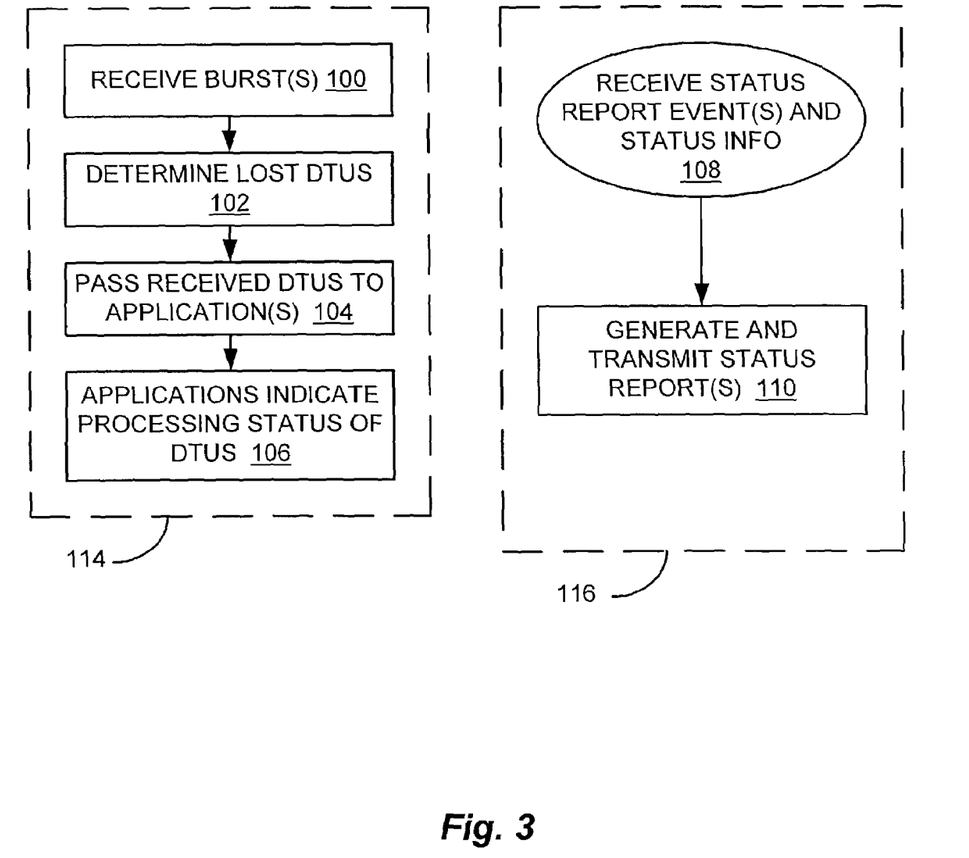
FIG. 3 is a flow chart showing steps performed by an illustrative embodiment in a receiving device.

FIG. 3 is a flow chart illustrating steps performed in a receiving device of an illustrative embodiment of the disclosed system. As shown in FIG. 3, a burst receiving and processing process 114 operates simultaneously with a status report generating and transmitting process 116. The processes 114 and 116 may be implemented as concurrent software processes, or as hardware logic, or any combination of software and/or hardware as appropriate for a specific application or embodiment.

At step 100 of the burst receiving and processing process 114, the receiving device receives a burst, and then determines at step 102 which, if any, DTUs in the burst were lost or damaged. Determination of lost or damaged DTUs may, for example, be performed using information within the burst, such as burst numbers, and/or conventional data integrity checks on each DTU, such as cyclic redundancy code (CRC) checks. The receiving device maintains the location of each lost or damaged DTU in the burst for subsequent transmission in a status report. At step 104, the receiving device passes successfully received DTUs from the received burst to one or more associated application programs. The application programs in turn record or provide indication of the processing status of each DTU they are passed for use when forming status reports.

Further as shown in FIG. 3, at step 108, the receiving device determines whether an event has occurred indicating that a status report should be transmitted to the transmitting device. In one embodiment, for example, a status report is generated and transmitted to the transmitting device in the event the end of a received burst is detected by the receiving device. Alternatively, or in addition, status reports may be generated and/or transmitted in the event that a status request message is received from the transmitting device. Further input at step 108 are data regarding the correct or failed receipt of DTUs in previously received bursts, as detected and recorded by the process 114.

In the event a status report is triggered by an event detected at step 108, at step 110 at least one status report is generated and transmitted to the transmitting device. The status report includes information indicating both the DTUs that require transmission within all previously received bursts, as well as the processing status of all DTUs in previously received bursts. The format of the status report generated at step 110 may, for example, consist of a packet or cell including implicitly or explicitly information, such as a bit mask, describing the receipt status of all bursts that have previously been received by that receiving device, for example over the course of a communications session between the receiving device and a transmitting device. In such an embodiment, the receipt status for all DTUs in every previously received burst is therefore transmitted multiple times from the receiving device to the transmitting device.

In response to indication of lost DTUs in the status report generated and transmitted at step 110, the receiving device will receive retransmitted data from the transmitting device, which can then be used to substitute for the previously lost or damaged DTUs.

As described above, both the transmitting device and the receiving device process multiple bursts simultaneously. Accordingly, even before the receipt of a status report from each receiving device regarding a first burst, or before receipt of a status report indicating correct receipt of all data within the first burst, the transmitting device may begin transmission of DTUs from a second burst. Moreover, while the receiving device is awaiting retransmission of a DTU that was not correctly received from the first burst, it can simultaneously begin processing other bursts in order to determine what kind of status report should be generated.

By organizing DTUs into simultaneously processed bursts, the disclosed system enables the use of any burst size, as may be appropriate for certain implementations, without causing an increase in potential wait times for the sending device and the receiving device. For example, the DTUs may vary in size, typically from 1 KB to 8 KB. In such an embodiment, the typical burst size may vary from 0.5 MB and 5 MB. Moreover, the simultaneous transfer of multiple bursts, such that the transmitting device continues to transmit other bursts while it is waiting for feedback on previously sent bursts, results in higher channel bandwidth utilization, and a total transmission speed that is close to channel capacity.

In one embodiment, bursts are processed simultaneously by both the transmitting device and the receiving device, in such a way that no more than a predetermined number of bursts are being processed at any one given moment. The "simultaneous" processing of multiple bursts in the disclosed system indicates that multiple bursts are processed concurrently, such that the multiple bursts may be processed either partially or fully in parallel.

In a preferred embodiment, the disclosed system operates in an environment in which file and/or streaming media content delivery is provided from a transmitting device to multiple receiving devices. For example, the data may be delivered over a multicast enabled network, such as a multicast enabled communication satellite-based communication network. Also in a preferred embodiment, status reports indicating whether the transmitted data was received correctly may be sent over a separate back-channel communication system, for example provided over the Internet, or over point to point connections.

The independent processing of a burst within the transmitting device starts with transmission of all DTUs constituting that burst to the receivers. In the preferred embodiment, every DTU contains information that helps receivers define the end of a burst. The transmitting device obtains status reports regarding each simultaneously processed burst from all the receiving devices to which the bursts were addressed. For example, a communication session between a transmitting device and multiple receiving devices may be provided through the use of multicast destination addresses associated with the transmitted bursts. In such an environment, the transmitting device may request burst status information from each one of multiple receiving devices separately. The transmitting device may subsequently retransmit lost DTUs and collect status information again to determine if the retransmissions were received correctly. Retransmissions may be made at various times, for example, between burst transmissions. The disclosed system continues operation until all receiving devices in the session correctly receive all the DTUs within each burst. Thus, the transmitting device and the receiving device may each have several bursts in processing at the same time. In this way, the disclosed system increases the likelihood that a transmitting device can continue transmitting data without waiting, and accordingly also decreases the likelihood of a receiving device waiting for such data.

Figure 4:
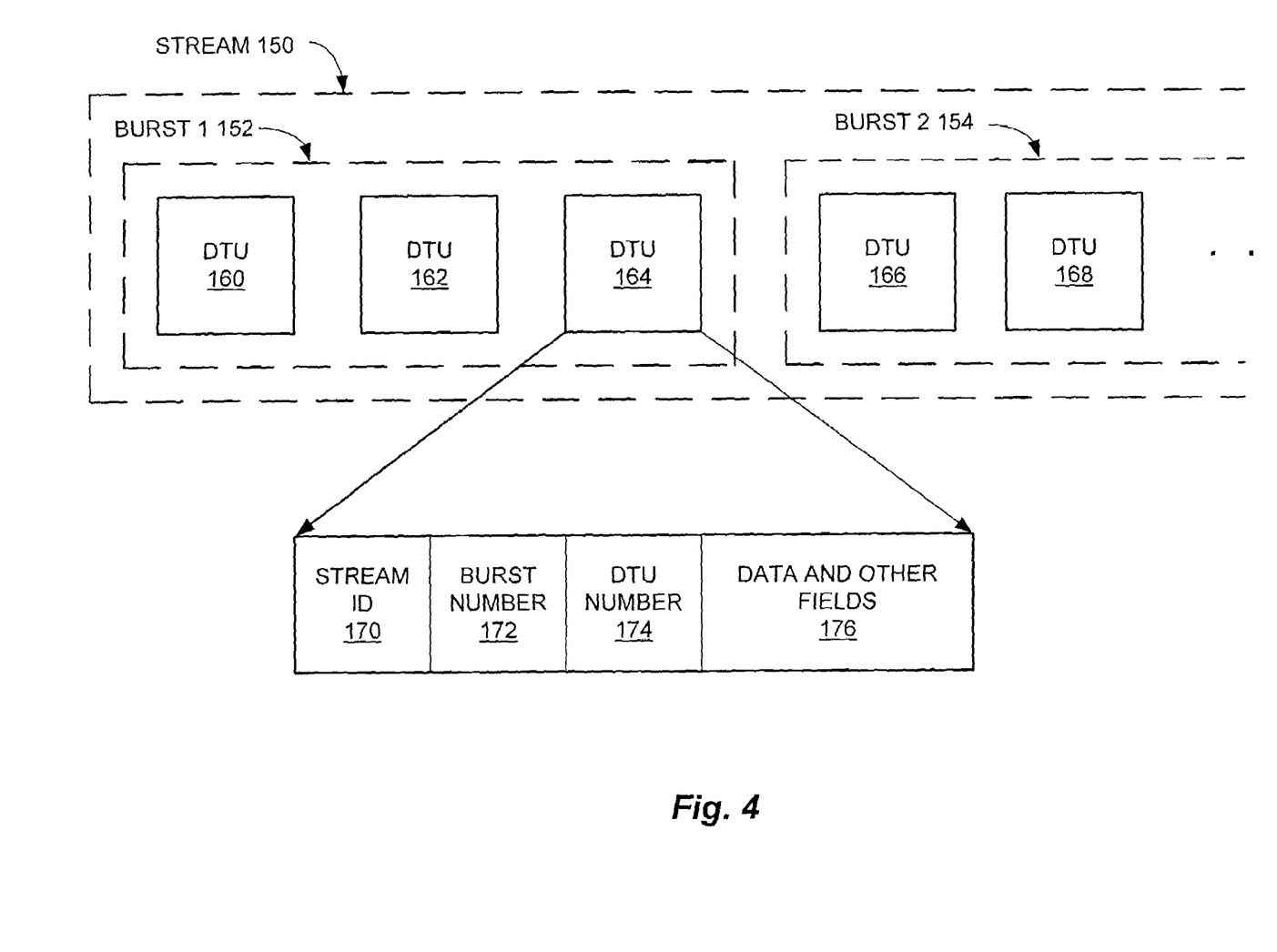
FIG. 4 is a block diagram showing an example of bursts of DTUs in a communication stream.

FIG. 4 shows an example of a data stream 150 including a series of multiple bursts, shown as burst 1 152 and burst 2 154. The stream 150 represents the communication of a contiguous stream of data from a transmitting device to multiple receiving devices, for example using multicast addressing, as in the case of a streaming media server application. A data stream such as the data stream 150 may include any number of bursts. Each of the bursts within the data stream 150 includes a series of multiple DTUs, shown as DTU 160, DTU 162 and DTU 164 in burst 1 152, and as DTU 166 and DTU 168 in burst 2 154. An example of fields for a DTU is shown with regard to DTU 164. The illustrative DTU fields are shown as including a stream ID 170, which identifies the data stream that includes the DTU, a burst number 172 that identifies the position of the burst containing the DTU within the stream, and a DTU number 174 that identifies the position of the DTU within the burst that contains it. The DTU 164 is further shown to include data and other fields 176.

As shown in FIG. 4, a burst may not include header information other than that associated with each DTU. Specifically, the association of DTUs into a burst is accomplished through the information contained in the burst number field 172 of each DTU contained in the burst. Further, the structure of each burst, in terms of the positions of the DTUs it contains, is described in the DTU number field 174. Accordingly, the burst "header" may be thought of as being distributed across the DTUs included within the burst.

Figure 5:
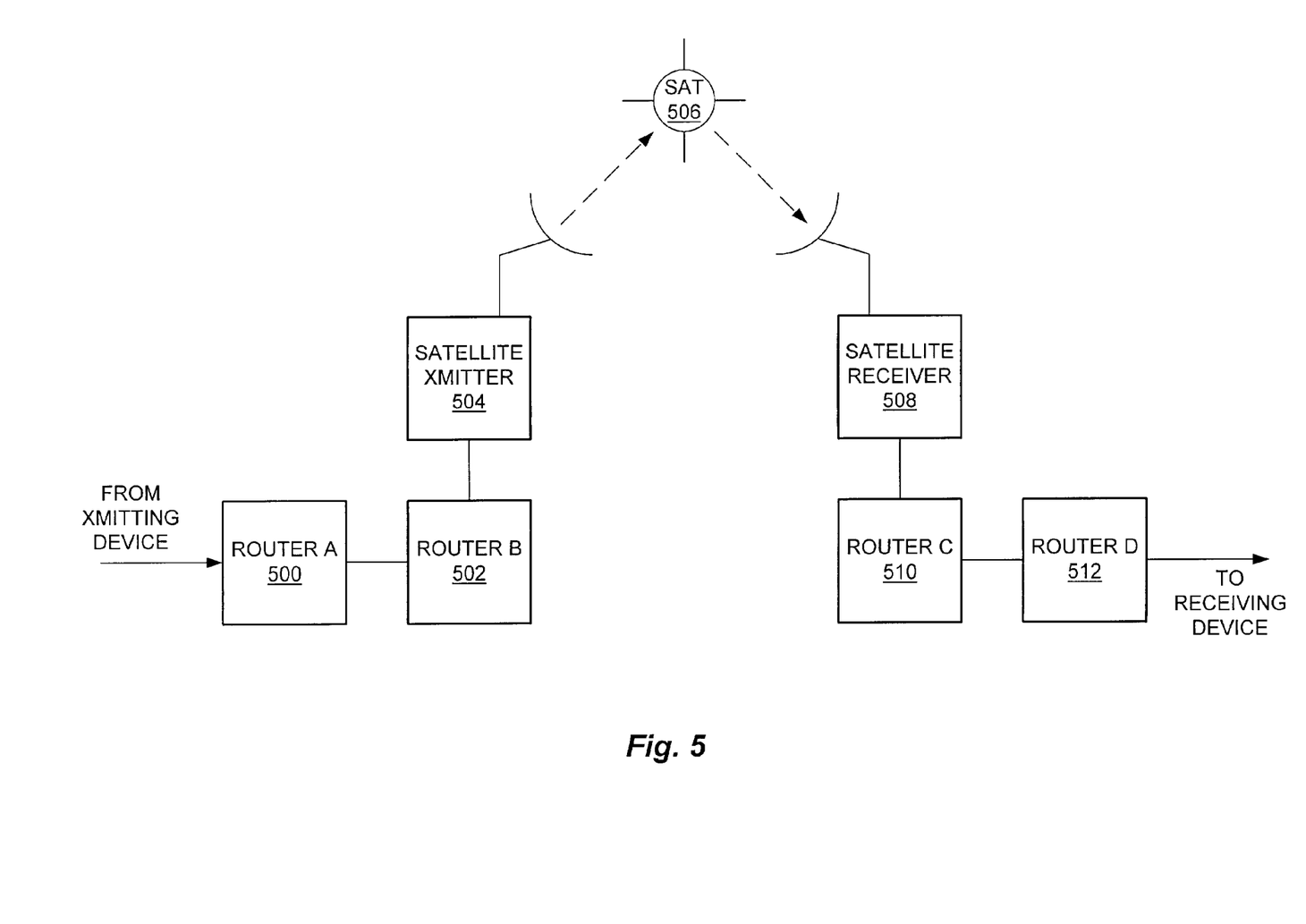
FIG. 5 shows an example configuration of the network 14 in FIG. 1.

FIG. 5 is a block diagram showing an example of a network over which data may be communicated using an embodiment of the disclosed system. The network illustrated in FIG. 5 is an example of the network 14 shown in FIG. 1. As shown in FIG. 5, data from a transmitting device passes through a Router A 500, to a Router B 502, and then to a Satellite Transmitter 504, which forwards the data to a Communications Satellite 506. The data is then passed by the Communications Satellite 506 to a Satellite Receiver 508, from which the data is passed through Router C 510 and Router D 512 to one or more receiving devices. The routers shown in FIG. 5 operate over an underlying communications network for which an MTU (Maximum Transmission Unit, Maximum Transfer Unit) may be predefined. The MTU for such a communications network is the largest frame size that can be transmitted over the network. Messages longer than the MTU must be divided into smaller frames. Typically, the layer 3 protocol (IP, IPX, etc.) extracts the MTU from the layer 2 protocol (Ethernet, FDDI, etc.), fragments the messages into that frame size and makes them available to the lower layer for transmission.

Figure 6:
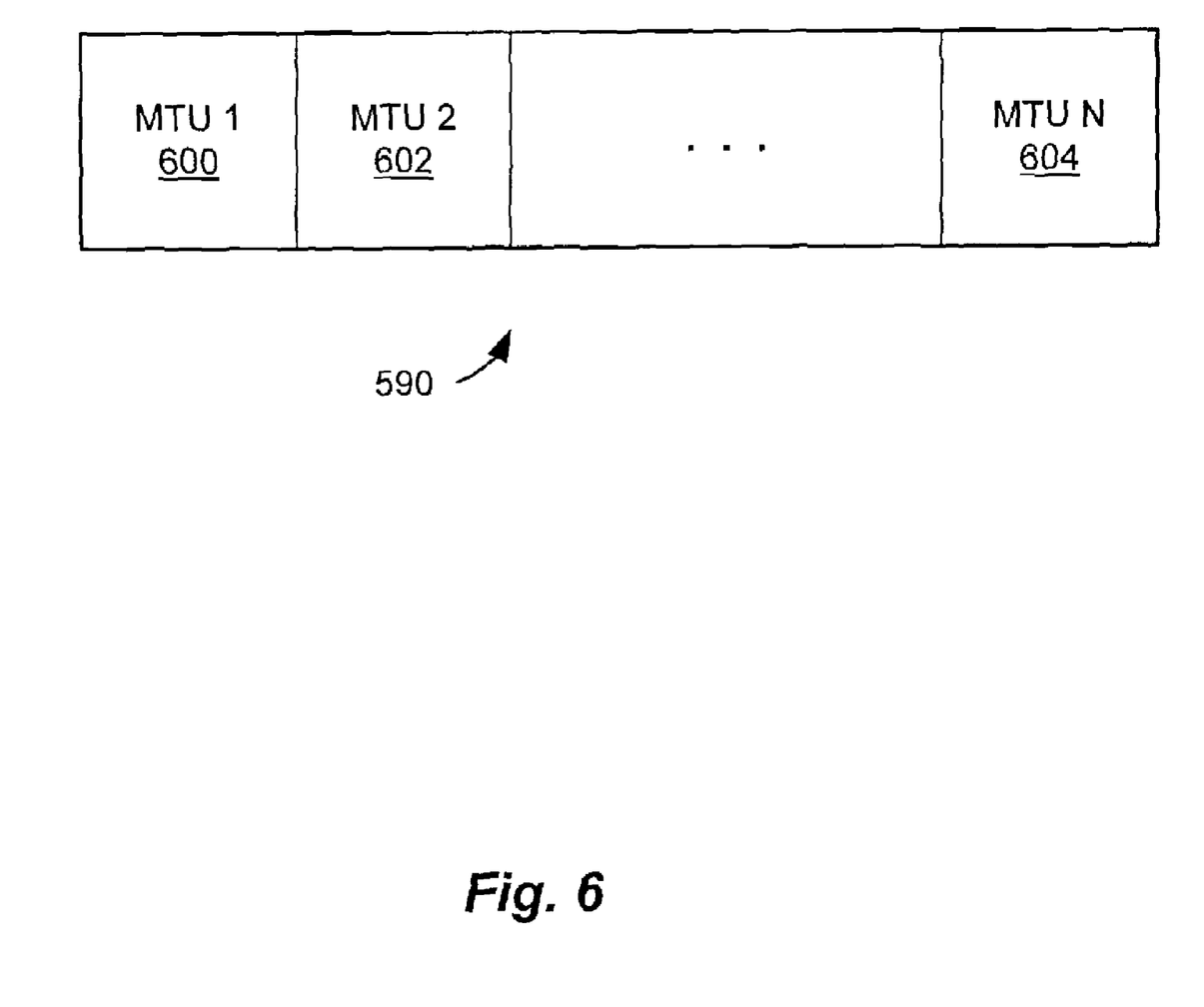
FIG. 6 shows an example of the data and other fields portion 176 of a DTU as shown in FIG. 4

FIG. 6 shows how the contents of an individual DTU may be configured to reflect the MTUs used in an underlying network such as the communications network shown in FIG. 5. As shown in FIG. 4, the format of a DTU may include a data and other fields portion 176. FIG. 6 shows an example of the format of the data and other fields portion of the DTU. The format shown in FIG. 6 includes one or more MTUs, including an MTU 1 600, MTU 2, 602, through MTU N 604. In this way, the size of the DTU may be advantageously determined to reflect the size of MTU within the underlying network. As a result, bandwidth utilization is improved. In specific embodiments or operational environments, the contents of each DTU may therefore consist of one or more Ethernet packets, or one or more IP packets.

The DTU size for a given embodiment may further be configured as a function of the loss rate of the underlying network. In this approach, smaller DTU sizes would be used when the underlying network provides more unreliable performance. Accordingly, for higher loss rates, smaller DTUs would be used, thus making relatively frequent retransmission of data more efficient, since less successfully received data would necessarily be included in each retransmission.

Those skilled in the art should readily appreciate that programs defining the functions of the disclosed system and method can be implemented in software and delivered to a system for execution in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the illustrative embodiments may be implemented in computer software, the functions within the illustrative embodiments may alternatively be embodied in part or in whole using hardware components such as Application Specific Integrated Circuits, Field Programmable Gate Arrays, or other hardware, or in some combination of hardware components and software components.

We claim:

1. A method of transmitting data over a network, comprising:

forming a plurality of data transfer unit bursts, each of said data transfer unit bursts including a plurality of data transfer units;

transmitting said bursts of data transfer units to at least one receiving device;

receiving a plurality of status report messages, each of said status report messages indicating a receipt status with regard to at least one previously transmitted data transfer unit;

recording, responsive to receipt of each of said plurality of status report messages, said receipt status with regard to said at least one previously transmitted data transfer unit;

wherein said transmitting continues in the event at least one of said plurality of status report messages indicates that said at least one previously transmitted data transfer unit was not successfully received; and retransmitting, at least at some times, said at least one previously transmitted data transfer unit that was not successfully received in response to a predetermined condition being met, wherein said transmitting said bursts of data transfer units includes, at least at some times, stopping, at least temporarily, transmission of said bursts of data transfer units in response to said predetermined condition being met, said method further including, in the event at least one status report message was not received indicating a receipt status with regard to at least one of said at least one previously transmitted data transfer unit, transmitting, at least at some times, at least one status request message to request said at least one status report message that was not received, while said transmission of said bursts of data transfer units is stopped, and wherein said retransmitting said at least one previously transmitted data transfer unit that was not successfully received includes retransmitting, at least at some times, said at least one previously transmitted data transfer unit that was not successfully received, while said transmission of said bursts of data transfer units is stopped.

2. The method of claim 1, wherein said transmitting continues in the event that said at least one of said plurality of status report messages indicates that said at least one previously transmitted data transfer unit was lost.

3. The method of claim 1, wherein said transmitting continues in the event that said at least one of said plurality of status report messages indicates that said at least one previously transmitted data transfer unit was damaged.

4. The method of claim 1, wherein a length of each of said data transfer units is less than a maximum data transfer unit length, and wherein said maximum data transfer unit length comprises an integral number of maximum transmission unit lengths with respect to at least a portion of said network.

5. The method of claim 1, wherein said recording said receipt status with regard to said at least one previously transmitted data transfer unit includes incrementing a retransmit counter in the event that said at least one previously transmitted data transfer unit was not successfully received.

6. The method of claim 5, wherein said predetermined condition is met in the event that a value of said retransmit counter equals a burst size, wherein said burst size is a maximum number of data transfer units included in each of said bursts of data transfer units.

7. The method of claim 6, wherein said predetermined condition is met further in the event that transmission is completed for all data transfer units in one of said bursts.

8. The method of claim 1, wherein said retransmitting said at least one previously transmitted data transfer unit that was not successfully received comprises transmitting repair data with regard to said at least one previously transmitted data transfer unit that was not previously received.

9. The method of claim 1, wherein said transmitting said sets of data transfer units further comprises transmitting said bursts of data transfer units to a plurality of receiving devices by including at least one destination address with said sets of data transfer units.

10. The method of claim 9, wherein said at least one destination address is a multicast address.

11. The method of claim 10, wherein said transmitting said bursts of data transfer units further comprises transmitting said bursts of data transfer units over a communication satellite based network.

12. The method of claim 11, wherein said receiving said plurality of status report messages comprises receiving a plurality of status report messages over a back channel interface, wherein said back channel interface operates to receive data from a back channel communications system that is separate from said communication satellite based network.

13. The method of claim 12, wherein said back channel communications system comprises the Internet, and wherein said status report messages comprise a plurality of Internet packets.

14. The method of claim 1, wherein each of said data transfer units comprises at least one Ethernet packet.

15. The method of claim 1, wherein each of said data transfer units comprises at least one Internet Protocol packet.

16. The method of claim 1, wherein each of said data transfer units includes an indication of an associated burst of data transfer units to which said data transfer unit belongs.

17. The method of claim 16, wherein said indication of said associated burst comprises a burst number.

18. The method of claim 16, wherein each of said data transfer units further includes an indication of a position of said data transfer unit within an associated burst.

19. The method of claim 18, wherein each of said data transfer units further includes an indication of a data stream associated with said data transfer unit.

20. A device for transmitting data over a network, said device operable:
to form a plurality of data transfer unit bursts, each of said data transfer unit bursts including a plurality of data transfer units;
to transmit said bursts of data transfer units to at least one receiving device;
to receive a plurality of status report messages, each of said status report messages indicating a receipt status with regard to at least one previously transmitted data transfer unit;
to record, responsive to receipt of each of said plurality of status report messages, said receipt status with regard to said at least one previously transmitted data transfer unit;
wherein said transmitting continues in the event at least one of said plurality of status report messages indicates that said at least one previously transmitted data transfer unit was not successfully received; and
to retransmit, at least at some times, said at least one previously transmitted data transfer unit that was not successfully received in response to a predetermined condition being met,
wherein said device is further operable, at least at some times, to stop, at least temporarily, transmission of said bursts of data transfer units in response to said predetermined condition being met,
wherein said device is further operable, in the event at least one status report message was not received indicating a receipt status with regard to at least one of said at least one previously transmitted data transfer unit, to transmit, at least at some times, at least one status request message to request said at least one status report message that was not received, while said transmission of said bursts of data transfer units is stopped, and
wherein said device is further operable to retransmit, at least at some times, said at least one previously transmitted data transfer unit that was not successfully received, while said transmission of said bursts of data transfer units is stopped.

21. The device of claim 20, wherein said device further comprises at least one processor coupled to a program memory.

22. A computer program product, including a computer readable medium, said computer readable medium having a computer program stored thereon, said computer program being executable by at least one processor for transmitting data over a network, said computer program comprising:
program code for forming a plurality of data transfer unit bursts, each of said data transfer unit bursts including a plurality of data transfer units;
program code for transmitting said bursts of data transfer units to at least one receiving device;

program code for receiving a plurality of status report messages, each of said status report messages indicating a receipt status with regard to at least one previously transmitted data transfer unit;

program code for recording, responsive to receipt of each of said plurality of status report messages, said receipt status with regard to said at least one previously transmitted data transfer unit;

wherein said transmitting continues in the event at least one of said plurality of status report messages indicates that said at least one previously transmitted data transfer unit was not successfully received; and program code for retransmitting, at least at some times, said at least one previously transmitted data transfer unit that was not successfully received in response to a predetermined condition being met, wherein said program code for transmitting includes program code for, at least at some times, stopping, at least temporarily, transmission of said bursts of data transfer units in response to said predetermined condition being met said computer program further including program code for, in the event at least one status report message was not received indicating a receipt status with regard to at least one of said at least one previously transmitted data transfer unit, transmitting, at least at some times, at least one status request message to request said at least one status report message that was not received, while said transmission of said bursts of data transfer units is stopped, and wherein said program code for retransmitting said at least one previously transmitted data transfer unit that was not successfully received includes program code for retransmitting, at least at some times, said at least one previously transmitted data transfer unit that was not successfully received, while said transmission of said bursts of data transfer units is stopped.

23. A device for transmitting data over a network, comprising:

means for forming a plurality of data transfer unit bursts, each of said data transfer unit bursts including a plurality of data transfer units;

means for transmitting said bursts of data transfer units to at least one receiving device;

means for receiving a plurality of status report messages, each of said status report messages indicating a receipt status with regard to at least one previously transmitted data transfer unit;

means for recording, responsive to receipt of each of said plurality of status report messages, said receipt status with regard to said at least one previously transmitted data transfer unit;

wherein said transmitting continues in the event at least one of said plurality of status report messages indicates that said at least one previously transmitted data transfer unit was not successfully received; and means for retransmitting, at least at some times, said at least one previously transmitted data transfer unit that was not successfully received in response to a predetermined condition being met, wherein said means for transmitting is operable, at least at some times, to stop, at least temporarily, transmission of said bursts of data transfer units in response to said predetermined condition being met, said device further including means for transmitting, at least at some times, in the event at least one status report message was not received indicating a receipt status with regard to at least one of said at least one previously transmitted data transfer unit, at least one status request message to request said at least one status report message that was not received, while said transmission of said bursts of data transfer units is stopped, and wherein said means for retransmitting is operable to retransmit, at least at some times, said at least one previously transmitted data transfer unit that was not successfully received, while said transmission of said bursts of data transfer units is stopped.

24. A computer data signal embodied in a carrier wave, said computer data signal including a computer program executable by at least one processor for transmitting data over a network, said computer program comprising:

program code for forming a plurality of data transfer unit bursts, each of said data transfer unit bursts including a plurality of data transfer units;

program code for transmitting said bursts of data transfer units to at least one receiving device;

program code for receiving a plurality of status report messages, each of said status report messages indicating a receipt status with regard to at least one previously transmitted data transfer unit;

program code for recording, responsive to receipt of each of said plurality of status report messages, said receipt status with regard to said at least one previously transmitted data transfer unit;

wherein said transmitting continues in the event at least one of said plurality of status report messages indicates that said at least one previously transmitted data transfer unit was not successfully received; and program code for retransmitting, at least at some times, said at least one previously transmitted data transfer unit that was not successfully received in response to a predetermined condition being met, wherein said program code for transmitting includes program code for stopping, at least temporarily, transmission of said bursts of data transfer units in response to said predetermined condition being met, said computer program further including program code for, in the event at least one status report message was not received indicating a receipt status with regard to at least one of said at least one previously transmitted data transfer unit, transmitting, at least at some times, at least one status request message to request said at least one status report message that was not received, while said transmission of said bursts of data transfer units is stopped, and wherein said program code for retransmitting said at least one previously transmitted data transfer unit that was not successfully received includes program code for retransmitting, at least at some times, said at least one previously transmitted data transfer unit that was not successfully received, while said transmission of said bursts of data transfer units is stopped.

* * * * *